Feb. 29, 1944.  P. O. DE ZARATE ET AL  2,342,926

STUFFING BOX

Filed June 1, 1942

Inventors
Pedro O. De Zarate,
Dudley S. Drabble,
By Wolhaupter & Groff
Attorneys Patented Feb. 29, 1944

2,342,926

UNITED STATES PATENT OFFICE 2,342,926

STUFFING BOX

Pedro Ortiz de Zarate and Dudley Steward Drabble, Buenos Aires, Argentina

Application June 1, 1942, Serial No. 445,326 In Argentina April 29, 1942

1 Claim. (Cl. 286—38)

This invention relates to a novel and improved type of stuffing box and has for its object a novel device embodying features of construction and operation, offering several advantages of importance over the devices of similar description heretofore proposed and used.

Stuffing boxes consisting, in general, of a packing of threads of hemp, asbestos, tow or other suitable material, conveniently packed or pressed in the interior of a stuffing box provided with a detachable gland and usually secured in position by means of bolts or the like, are well known.

The stuffing boxes of this type offer the disadvantage that when the packing has worn to a certain degree, the gland must be dismounted in order to change or replace the packing. This is a troublesome operation which requires, besides the necessity of stopping the machine, a considerable amount of time and the employment of a skilled worker.

In order to avoid the above trouble, we have devised an improved stuffing box which is adapted to constantly keep in perfect operating condition and which also permits of the whole or part of the packing being changed or replaced by means of a simple, speedy and easy operation, without necessity of interrupting the working of the machine.

The invention also has other objects in view which will hereinafter appear and will more fully be understood when considering the following description of the improved device.

Figure 1:
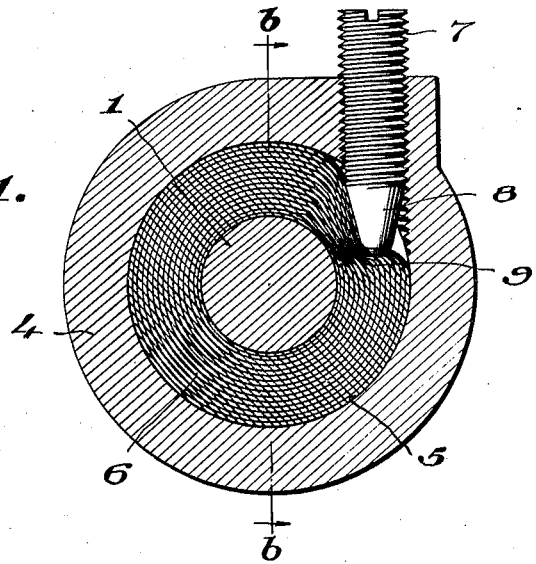
Figure 2:
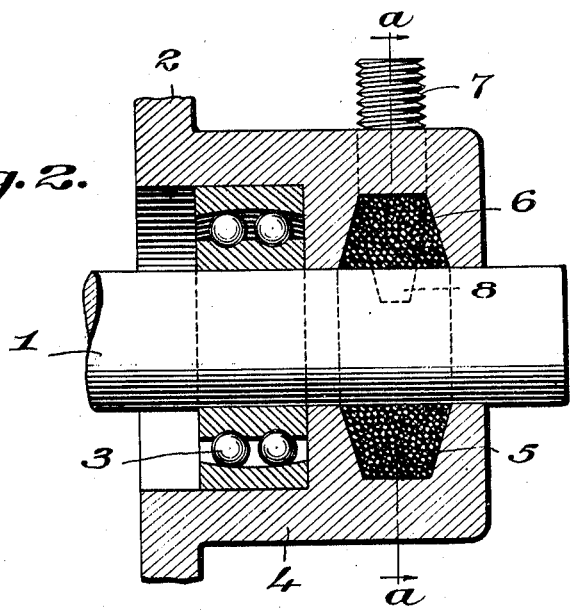

In order that our invention may be clearly understood and carried into practice without difficulty, a preferred form of construction of the same has been shown, by way of example, in the accompanying illustrative drawing, wherein:

Figure 1 shows a view in cross section of our improved type of stuffing box, in accordance with this invention, the section being taken on the line A—A of Figure 2, and Figure 2 is a longitudinal section of the stuffing box shown in Figure 1, as applied to a rotating axle.

Similar numbers of reference have been used to indicate like or corresponding parts in both views.

In the embodiment shown, I indicates a rotating axle, such as that of an engine or the like, journaled in a cylinder head 2 by means of ball bearings 3 or similar suitable elements.

In accordance with this invention, from the cylinder head 2 extends an extension 4, which may be made integral with said cylinder head 2 or consist of a separate member, adapted to be secured in position on the head by any suitable means.

When observing the drawing, it will be seen that said extension 4 is formed on its inner wall with an annular groove 5, concentric with the axle 1 and of trapezoidal shape in cross section, thus including a transversely flat peripheral wall and the inwardly diverging side walls, thereby adequately to hold the packing 6 which may consist, as usual, of suitable threads of hemp, asbestos, tow or other convenient materials used for that purpose.

Through a threaded bore formed in the extension 4 extends a screw 7, of which the inner end 8, preferably of truncated conical shape, projects tangentially into the said groove 5.

Under these conditions, when a certain amount of loosening or wear of the packing 6 has taken place, it will be sufficient to slightly screw home the screw 7, so as to cause its inner frusto-conical end 8 to apply the necessary degree of pressure to the packing, such as clearly shown by the reference number 9, and upon the axle 1 continuing its rotating motion, the body of packing material 6, originally compressed to a rather excessive extent, will then be gradually distributed in an even manner over the entire periphery of said packing.

When an extreme degree of wear of the packing has taken place, the screw 7 is removed entirely and through the threaded bore and into the orifice left beneath the same, a suitable amount of packing material may be introduced, after which the screw 7 is replaced in position.

If desired, instead of arranging the end 8 of a screw to act on the packing, a separate member of suitable material and of a shape similar to that of the end 8 of the screw 7, might be made to engage with said material, and between said member and the end of the screw 7 which in that case may be of the common type, a spring or similar element may be arranged, so as to cause the former of said members to apply a convenient degree of resilient pressure to the packing, adapted to be adjusted by correspondingly screwing home or unscrewing the screw 7.

It will be evident that instead of arranging only one screw 7 on the stuffing box, as in the embodiment shown, two or more of the same may be provided, suitably distributed over the entire periphery of the packing 6, whereby a more convenient spreading of the pressures applied to the same will be secured.

While in the form of construction shown and described, the improved type of stuffing box has been applied to a rotating axle, it will be evident that a device of similar arrangement may conveniently be used in connection with reciprocating shafts, or for securing a tight fitting of other moving members.

From the foregoing, it is believed that the nature of the invention will be fully understood by those skilled in the art and it will also be evident that modifications may be resorted to within the scope of the appended claim without departing from the spirit of the invention.

We claim:

A stuffing box for shafts, including, in combination, a body having a shaft receiving bore provided thereabout with an annular packing groove having a transversely flat peripheral wall lying radially outward of the axis of the bore, said groove having side walls diverging toward said bore, said body also having a threaded passage whose diameter is equal to the width of said flat peripheral wall and whose outer side is disposed tangentially to said wall; an annular compressible, laminated, non-metallic packing filling and conforming to the cross-sectional shape of said groove, and a screw fitted in said threaded passage and having a frusto-conical inner end whose side wall bears obliquely against and slides over a portion of the packing near the flat peripheral wall while the blunt end thereof moves against the packing between said wall and the bore whereby, as the screw is progressively moved inwardly, the said packing is compressed obliquely toward the shaft away from said flat peripheral wall and also is forced inwardly between said diverging side walls of the groove to provide and maintain a wide area of contact between the inner face of the packing and the shaft in the bore.

PEDRO ORTIZ DE ZARATE.
DUDLEY STEWARD DRABBLE.